United States Patent [19]

Fernandez

[11] Patent Number: 5,322,148
[45] Date of Patent: Jun. 21, 1994

[54] ADAPTER KIT FOR A CLUTCH

[76] Inventor: Robert A. Fernandez, 741 Spindle Hill Rd., Wolcott, Conn. 06716

[21] Appl. No.: 103,548

[22] Filed: Aug. 9, 1993

[51] Int. Cl.$^5$ .................. F16D 13/56; F16D 13/68
[52] U.S. Cl. .................. 192/70.13; 192/70.19; 192/70.2; 192/70.27
[58] Field of Search .............. 192/70.13, 70.11, 70.27, 192/70.2, 70.17, 70.19

[56] References Cited

U.S. PATENT DOCUMENTS

| | | | |
|---|---|---|---|
| 1,009,702 | 11/1911 | Utz | 192/70.13 |
| 1,344,399 | 6/1920 | Holt | 192/70.13 |
| 1,491,201 | 4/1924 | Detlaff | 192/70.13 |
| 1,495,604 | 5/1924 | Lipe et al. | 192/70.13 |
| 1,910,084 | 5/1933 | Bixby | 192/70.27 X |
| 2,095,140 | 10/1937 | Leeson | 192/70.27 X |
| 2,593,521 | 4/1952 | Ball | 192/70.2 X |
| 2,632,543 | 3/1953 | Wilson | 192/70.13 |
| 3,747,729 | 7/1973 | Storer, Jr. | 192/70.13 X |
| 4,977,991 | 12/1990 | Mahoney | 192/70.27 X |
| 5,038,904 | 8/1991 | Miller | 192/70.2 |

Primary Examiner—Leslie A. Braun
Assistant Examiner—Andrea Pitts
Attorney, Agent, or Firm—Dallett Hoopes

[57] ABSTRACT

An adapter kit for a clutch of the axially engaging, multiple-disc type as described above and includes a sleeve adapted after removal of the original keys to fit snugly into the shell, reducing its inside diameter. The sleeve is radially drilled and tapped and receives bolts through the same holes, occupied by bolts holding on the original keys, the sleeve being provided with inward keys of greater number than the original keys. The kit also comprises a set of adapter discs adapted to replace the original discs and consisting of a greater total number of discs than the original discs, the set comprising drive discs pressed of fibrous non-metallic material and being of the same diameter as the inside of the sleeve. The drive discs have peripheral notches arranged to receive respectively the keys on the sleeve, the drive discs having a central opening amply receiving the studs and pins on the hub. In the set the drive discs alternate with driven discs of thin metal and formed with apertures to receive respectively the individual studs and pins, the driven discs not extending out to the keys.

4 Claims, 1 Drawing Sheet

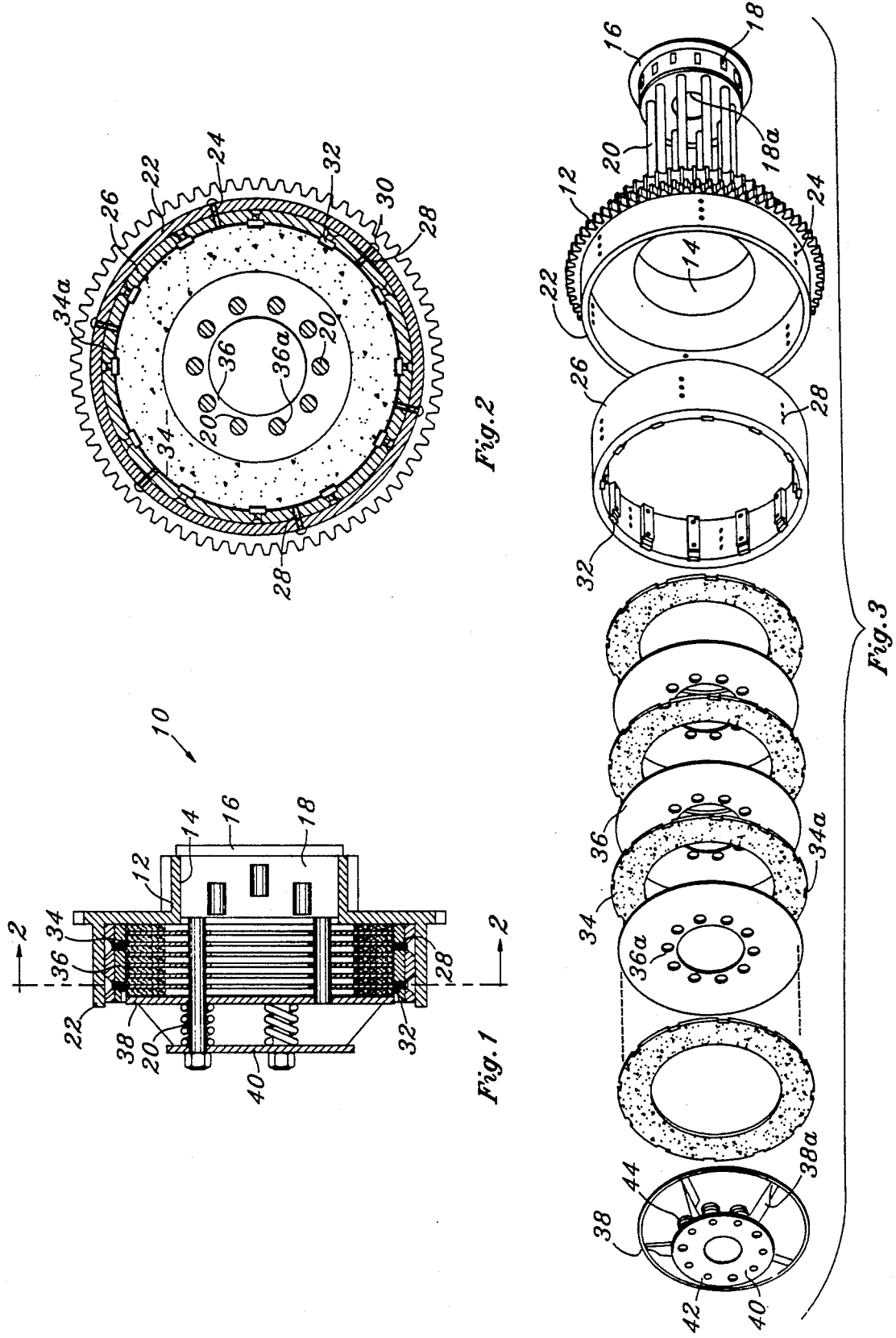

ADAPTER KIT FOR A CLUTCH

BACKGROUND OF THE INVENTION

1. Field of the Invention

This invention relates to a kit by which an existing motorcycle clutch can be adapted to give it structure affording lighter touch engagement and disengagement, more secure engagement (that is, better gripping power) and generally quieter operation.

2. Description of Related Art including Information Disclosed under §§1.97 to 1.99

Since 1936 the Harley Davidson "Big Twin" FLH motorcycle has had a dry clutch of the axial-engaging multiple disc-type having a drive or drive cylinder shell with a bearing in one end and a driven or output hub in the bearing. A circular array of studs and pins has extended into the shell from the hub, the studs being parallel to the axis of the shell. The shell has bolted-on inward keys, also parallel to the axis and alternating drive and driven discs in the shell, the drive discs of bare metal have had notches in their perimeters adapted to receive respectively the keys. A compression plate which is spring biased toward the discs compresses the discs together when the clutch is engaged so that the rotary movement of the shell is communicated to the hub; Means are provided to move the compression plate away from the discs against the spring bias to disengage the clutch.

While the above arrangement was used on Harley Davidson motorcycles from about 1936 to 1984, there has been basis for complaint in the performance. For one thing, the driven discs have been of metal and have extended all the way to the inside periphery of the shell. As a consequence, when the clutch is disengaged, the discs being relatively free, have vibrated inside the shell against the keys causing an unacceptable rattling noise. In addition, there being a relatively small number of discs, engagement of the clutch has required strong springs between the spring collar and the compression plate. This has required substantial force to back off the compression plate and disengage the clutch. Further, the metal driven discs have tended, as the shell rotates, to wobble giving the perception of quasi-engagement so that at times, even with the clutch "disengaged", motion is transmitted between the shell and the hub. This clearly is unacceptable.

SUMMARY OF THE INVENTION

The present invention is an adapter kit for a clutch of the axially engaging, multiple-disc type as described above and includes a sleeve adapted after removal of the bolted-on keys to fit snugly into the shell, reducing its inside diameter. The sleeve is radially drilled and tapped and receives bolts through the same holes occupied by bolts holding on the original keys, the sleeve being provided with inward keys of greater number than the original keys.

The kit also comprises a set of adapter discs adapted to replace the original discs and consisting of a greater total number of discs than the original discs, the set comprising drive discs pressed of fibrous non-metallic material and being of the same diameter as the inside of the sleeve. The drive discs have peripheral notches arranged to receive respectively the keys on the sleeve, the drive discs having a central opening amply receiving the studs and pins on the hub. In the set the drive discs alternate with driven discs of thin metal and formed with apertures to receive respectively the individual studs and pins, the driven discs not extending out to the keys.

BRIEF DESCRIPTION OF THE DRAWINGS

Further objects and features of the invention will be apparent from the following specification and a study of the accompanying drawings, all of which disclose a non-limiting embodiment of the invention. In the drawings:

FIG. 1 is an axial sectional view showing a clutch having installed therein the adapter kit of the invention;

FIG. 2 is a sectional view taken on the line 2—2 of FIG. 1; and

FIG. 3 is an exploded view of the assembly of FIG. 1 in which some of the discs are eliminated to conserve drawing space.

DESCRIPTION OF THE PREFERRED EMBODIMENT

A clutch having the adapter kit of the invention installed therein is designated 10 in FIG. 1. It comprises a shell 12 having a central opening forming an annular bearing race 14. A hub 16 supported on a shaft (not shown) by which its rotation may be conveyed to a wheel comprises a bearing portion 18 provided with suitable roller bearings as shown so that it freely rotates the race 14. A circular array of studs and pins 20 extend in a direction parallel to the axis. The studs, longer than the pins, are threaded at their ends.

The shell 12 is formed with an outward basket 22 which is formed with uniformly spaced radial bores 24 (FIG. 2). Earlier these bores were fitted with bolts (not shown) to secure the original keys in the shell.

Fitting snugly into the shell is the cylindrical sleeve 26. The sleeve is formed with spaced tapped bores 28 and bolts 30 extend through the openings 24 and threadedly engage in the bores 28 to secure the sleeve in position. As shown, the sleeve is provided with keys 32 which extend inward from the sleeve and are parallel to the axis. The number of keys 32 is far greater than the original number of keys, the original number being only the number of positions of the bores 24. The keys 32 are preferably held in position on the sleeve by flat head Allen wrench bolts, the heads of which are countersunk so as to not interfere with the shell 22.

The original discs having been removed, the space inside the shell receives alternating drive discs 34 of composition material and metal driven discs 36. The drive discs are of pressed fibrous material, preferably available under the trademark "RAYBESTOS" stock No. R500B, similar in nature to brake linings. The periphery of the drive discs are notched as at 34a and receive respectively the keys 32. Because there are a far greater number of keys than in the original clutch, the non-metallic, less strong character of the drive disc 34 can absorb and transmit the rotational force imparted by the sleeve 26. The inner diameter of the drive discs 34 is such that it amply clears the studs and pins 20.

The driven discs 36 are of steel and thinner than the steel which comprise the earlier drive discs originally provided in the clutch. For example, the thickness of the disc 36 in the adapter kit is, for example, 0.090 inch, whereas the metal discs which formerly were in the clutch serving as the drive discs were 0.125 inch.

(The driven discs in the original clutch were also metal with a composition facing, the metal having a thickness of about 0.090 inch. Thus the driven discs were 0.225 inch with the facing.)

As shown, the driven discs 36 are centrally apertured and also apertured as at 36a to receive respectively the original studs 20. The outer diameter of the driven discs 36 do not extend out sufficiently far to engage the keys 32.

In assembly, the alternating drive and driven discs 34, 36 fit into the sleeve 26 so that openings 36a receive the studs 20 and the notches 34a receive the keys. A compression plate 38, circular in nature, is provided. It may be stiffened by radial ribs 38a. A clutch hub (not shown) extends through the circular opening 18a in the hub and has bolted on its end the spring collar 40. The collar is formed with holes 42 which line up with and receive respectively the studs 20, the ends of the studs being nutted to support the collar. Compression springs 44 are received onto the studs and are disposed on the studs between the collar 40 and the compression plate 38.

In disengagement of the clutch, the clutch shaft (not shown) which is disposed on the axis of the driven shaft passing through hole 18a on the hub may move the compression plate 38 outward to disengage the clutch. Oppositely, to engage the clutch, the operating shaft may permit the springs 44 to move the compression plate 38 against the outer drive disc 34 to axially compress the disc engaging the clutch.

As stated, once the adapter kit has been installed with its composition drive discs 34, its larger number of keys 32 and its larger number of discs—there are 13 discs in the preferred embodiment, as opposed to nine in the original clutch, the clutch will operate with greater gripping power under lighter spring pressure, is less prone to disc wobble perceived as quasi-engagement and is generally quieter in operation than before the adaptation.

It should be understood that the invention is not limited to the embodiment shown but the invention is instead defined by the scope of the following claim language, expanded by an extension of the right to exclude as is appropriate under the doctrine of equivalents.

What is claimed is:

1. An adapter kit for a clutch which is of the axially engaging multiple-disk type including a driver cylindrical shell having an axis with a bearing in one end and a driven hub in the bearing, a circular array of studs secured in the hub and having distal ends extending into the shell and parallel to the axis, circumferentially spaced inward original keys parallel to the axis and fastened to the shell by bolts, alternating original drive and driven clutch discs disposed radially in the shell, the drive discs being of metal and notched at their peripheries to receive respectively the keys and driven discs formed with apertures to receive respectively the studs, a spring collar secured to the distal ends of the studs, a clutch compression plate intermediate the discs and the spring collar and spring means between the compression plate and the spring collar urging the compression plate to compress the discs together to engage the clutch, the kit comprising:

a sleeve having an inside diameter and adapted after removal of the original drive and driven discs and the bolted-on keys to fit snugly into the shell, the sleeve being radially drilled and tapped and receiving threaded fasteners through the same holes occupied by the bolts holding on the original keys to secure the sleeve in position, the sleeve being provided with inward keys of greater number than the original keys, a set of adapter discs adapted to replace the original discs and consisting of a greater total number of discs than the original discs comprising alternating:

drive discs, the drive discs being of non-metal composition and of the same diameter as the inside diameter of the sleeve and having peripheral notches arranged to receive the keys on the sleeve, the drive discs having a central opening amply receiving all of the studs, and driven discs of metal having a thickness and formed with apertures to receive respectively the individual studs, the driven discs not extending out to the keys, whereby with the sleeve installed in the shell and the adapter discs installed in place of the original discs, the clutch operates under lighter spring pressure, is less prone to disc wobble perceived as quasi-engagement and is generally quieter in operation than before the adaptation.

2. An adapter kit as claimed in claim 1 wherein the drive discs are of compressed fibrous material.

3. An adapter kit as claimed in claim 1 wherein the thickness of the metal driven discs is about 0.090 inch.

4. An adapter kit as claimed in claim 1 wherein the total number of discs is 13.

* * * * *